3,594,372
PYRIMIDO[4,5-e][1,4]OXAZEPIN-5-ONES AND DERIVATIVES THEREOF
Arthur A. Santilli, Havertown, and Dong H. Kim, Wayne, Pa., assignors to American Home Products Corporation, New York, N.Y.
No Drawing. Filed Aug. 13, 1968, Ser. No. 752,164
Int. Cl. C07d 99/04
U.S. Cl. 260—247.2B                                21 Claims

ABSTRACT OF THE DISCLOSURE

Pyrimido[4,5-e][1,4]oxazepin-5-ones are prepared by the reaction of a 5-carbethoxy-4-chloropyrimidine with an aminoethanol. Compounds resulting from the reaction are pharmacodynamically active, particularly as central nervous system depressant agents.

DESCRIPTION OF THE INVENTION

The invention relates to oxazepinones and their preparation, and more particularly to pyrimido[4,5-e][1,4]-oxazepinones and derivatives thereof.

It has been found that the reaction of an aminoethanol, particularly a substituted aminoethanol with a 4-chloropyrimidine-5-carboxylic acid ester will produce bicyclic pyrimido-oxazepin-5-ones having interesting and useful pharmacological properties.

The compounds falling within the scope of the invention and produced by the aforesaid reaction may be illustrated by the structural formula:

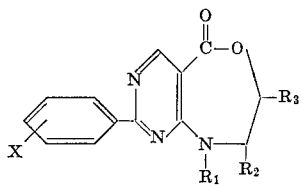

the symbol X standing for hydrogen, lower alkyl, lower alkoxy, chlorine, bromine, or fluorine; $R_1$ standing for lower alkyl, hydroxy(lower)alkyl, methoxy(lower)alkyl, di(lower)alkylamino(lower)alkyl, cyclopentyl, cyclohexyl, pyrrolidino(lower)alkyl, morpholino(lower)alkyl, phenyl, or phenyl(lower)alkyl; with $R_2$ standing for hydrogen or methyl and $R_3$ standing for hydrogen, phenyl, or naphthoxy(lower)alkyl.

The term "lower" or "lower alkyl" as used herein with respect to the aliphatic radicals are intended to mean alkyls of 1 to 4 and preferably from 1 to 3 carbon atoms. As part of the aromatic radicals, the term "lower alkyl" is intended to mean alkyls of 1 to 2 carbon atoms.

The compounds represented by the above-illustrated formula have been found to possess pharmacodynamic activity particularly on the central nervous system. More specifically, they have been found to be useful as central nervous system depressants. Additionally, some of the compounds of the invention have been found to have activity as analgesics and anticonvulsants when subjected to standard and scientifically acceptable pharmacological testing procedures. The compounds of the invention are thus useful in these fields in experimental and comparative pharmacology.

A typical and scientifically acceptable pharmacological procedure for determining central nervous system activity in warm-blooded animals, for example, mice, may be carried out in the following manner. The compound to be tested is administered orally, or for a more immediate effect, intraperitoneally, to three mice (CF-1 14 to 24 grams) at each of the following doses: 400, 127, 40, and 12.7 mg./kg. The animals are watched for a minimum of two hours during which time signs of general stimulation or general depression (i.e., decreased spontaneous motor activity, decreased respiration), if present, will be noted. The animals are tested for changes in reflexes (i.e., flexor, extensor) and are rated by use of a pole climb and inclined screen for the presence of sedation-ataxia by known procedures.

An analgesic test may be carried out using the "hot-plate" procedure described by Eddy et al., J. Pharm. Exper. Thera. 107: 385, 1953.

Another experiment that may be carried out involves subjecting each animal to a chemical (Metrazol) and/or a maximal electroshock to test for anticonvulsant activity. The latter may be carried out preferably according to the published procedure of Swinyard et al. in J. Pharm. 106, 319 (1952) using oral administration of the test compound at graded dose levels, for example, as given above to groups of six mice. One hour later, the animals are given a supramaximal electroshock through corneal electrodes (25 ma., 0.2 sec.). Presence or absence of tonic extensor seizures as well as the number of deaths are recorded. The percent protection against seizures is calculated to determine the anticonvulsant effects at the various dosages given. The effects achieved may then be compared to known or standard anticonvulsants.

Another anticonvulsant test substantially similar to that indicated by Swinyard et al. which they term the Metrazol seizure threshold test (Met) but easier to carry out involves the use of mice and drug administration orally or intraperitoneally rather than by subcutaneous injection. In such a test procedure, the compound may be administered orally or intraperitoneally to groups of six mice (3 males and 3 females). One hour later (or one-half hour later if the compound was administered i.p.) the animals are challenged with Metrazol, 125 mg./kg., i.p. The incidence of clonic and tonic convulsions and deaths is observed for one-half hour. Protection against convulsion and death is determined by comparison with controls run simultaneously. An $ED_{50}$ against convulsions and/or death is calculated from probit-log dose curves.

With respect to the compounds falling within the scope of the invention, central nervous system depressant action under the aforementioned testing procedures was found in mice in dosages ranging from 12.7 to 400 mg./kg., but mainly in doses from 127 to 400 mg./kg. Compounds showing anticonvulsant activity demonstrated this action at 40 to 400 mg./kg. Compounds showing analgesic action, demonstrated this response at doses from 127 to 400 mg./kg., also in mice. Since testing up to 400 mg./kg. was carried out in all instances, the compounds were clearly effective up to this point without evidence of substantial toxicity. Thus, the utility of the compounds orally or parenterally in the field of experimental or comparative pharmacology involving drug effects and comparisons in mice has been observed. It may be assumed that such results will apply also to other warm-blooded animals.

The compounds of the invention may be used in the free base form or, where possible, in the form of acid-addition salts. The latter may be prepared in known manner from a reactive base (i.e. having an amino substituent) by reaction with an organic or inorganic acid. Many acids are known for this purpose which are capable of producing nontoxic and pharmaceutically acceptable acid-addition salts, and merely for illustrative purposes, examples given below teach the preparation of specific hydrochloride salts. Salts are generally used particularly when parenteral compositions in aqueous form are contemplated. However, a base compound may also be used in known medicinal oleagenous vehicles in which it would be soluble. Oral dosage compositions also fall within the purview of this invention and may be prepared for the uses indicated, the active ingredient being combined with other pharmacologically active substances and/or with inert carriers, excipients, vehicles, or diluents.

Reverting to the reactions involved in preparing the compounds of the invention, which may be identified as in Formula III, the process is carried out according to the following reaction scheme, the symbols X, $R_1$, $R_2$, and $R_3$ having the same meanings as previously indicated.

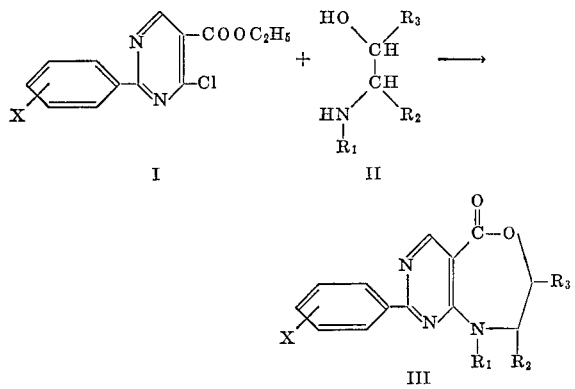

The reaction is carried out in an oxygen-containing solvent medium, for example, an alkanol solvent, preferably ethanol, and an acid-acceptor such as sodium carbonate. The reaction is carried out at the refluxing temperature of the selected solvent, reaction generally being complete in from 2 to 5 hours.

The starting reactants as illustrated above are commercially available compounds or are known and may be prepared by those skilled in the art. Examples for preparing certain reactants are given below in the interests of a fuller understanding of the invention.

The following specific examples describe the invention in greater detail but are given merely for illustrative purposes and not to be considered as limitative of the invention.

EXAMPLE 1

2-(1-pyrrolidinylethylamino)ethanol

To an ice-cold solution of 22.8 g. of 2-(1-pyrrolidinyl)-ethylamine in 100 ml. of methanol was added dropwise over 25 min., 11 g. of ethylene oxide. The reaction mixture was stirred at room temperature an additional 2 hours. The reaction solution was taken to dryness on a rotary evaporator in vacuo and the residue fractionally distilled under reduced pressure. The desired fraction distilled at 110–113° C. (0.25 mm.).

*Analysis.*—Calcd. for $C_8H_{18}N_2O$ (percent: C, 60.72; H, 11.47. Found (percent): C, 60.14; H, 11.82.

EXAMPLE 2

5-carbethoxy-2-(m-chlorophenyl)-4-hydroxypyrimidine

To a stirred solution of 15.6 g. of sodium metal in 1200 ml. of ethanol was added 64 g. of m-chlorobenzamidine hydrochloride, followed by the dropwise addition of ethoxymethylene malonate (total addition time 20 min.). The reaction mixture was heated under reflux for 40 min. The reaction mixture was chilled in ice and filtered under suction. The sodium salt thus obtained was dissolved in 1 l. of water. The solution was acidified with conc. hydrochloric acid. The product which was deposited out of solution was removed by filtration. The product, after drying, had a melting range of 178–182° C. An analytical sample (M.P. 180–181°) was obtained by recrystallization from ethanol.

*Analysis.*—Calcd. for $C_{13}H_{11}ClN_2O_3$ (percent): C, 56.03; H, 3.98; Cl, 12.72; N, 10.05. Found (percent): C, 56.33; H, 4.00; Cl, 12.60; N, 10.12.

EXAMPLE 3

5-carbethoxy-4-chloro-2-(m-chlorophenyl)pyrimidine

The title product was prepared by boiling 50 g. of 5-carbethoxy - 2 - (m - chlorophenyl)-4-hydroxypyrimidine in 450 ml. of thionyl chloride for 26 hours. The excess thionyl chloride was removed on a rotary evaporator: approximately 50 g. of ice was added to the residue which solidified after several washings with water. The product was dried in a desiccator and used without purification.

EXAMPLE 4

9-ethyl-8,9-dihydro-2-phenylpyrimido[4,5-e][1,4]oxazepin-5(7H)-one

A mixture of 4-chloro-5-carbethoxy-2-phenylpyrimidine (13 g.), N-ethyl ethanolamine (4.5 g.), sodium carbonate (5.0 g.) and dimethylformamide (60 ml.) was stirred at room temperature for 45 min., then heated to reflux for 10 min. The reaction mixture was poured into 250 ml. of water whereby an oil was separated. After decanting the aqueous layer the remaining oil was treated with aqueous sodium hydroxide solution (20%) which caused solidification of the oil. The solid was recrystallized from absolute ethanol to give 2.0 g. of the product, M.P. 126–128° C.

*Analysis.*—Calcd. for $C_{15}H_{15}N_3O_2$ (percent): C, 66.90; H, 5.61; N, 15.61. Found (percent): C, 66.81; H, 5.56; N, 15.64.

EXAMPLE 5

8,9-dihydro-9-methyl-2-phenylpyrimido[4,5-e][1,4]oxazepin-5(7H)-one

Method A: The compound was prepared as in Example 4 from 4-chloro-5-carbethoxy-2-phenylpyrimidine, N-methylethanolamine, and sodium carbonate in dimethylformamide solvent. Recrystallization from ethanol afforded an analytical sample, M.P. 170–173° C.

*Analysis.*—Calcd. for $C_{14}H_{13}N_3O_2$ (percent): C, 65.87; H, 5.13; N, 16.46. Found (percent): C, 65.68; H, 4.98; N, 16.23.

The compounds of Examples 4 and 5 above showed anticonvulsant as well as central nervous system depressant activity.

Method B: One and a half grams of 4[(2-hydroxyethyl)methylamino] - 2 - phenyl-5-pyrimidinecarboxylic acid was put in a test tube, and the test tube was immersed in an oil bath. The temperature of the oil bath was increased to 180°, and kept at the temperature for 1 hour. The test tube was cooled to room temperature, and solid mass was recrystallized from ethanol to give the title product M.P. 168–172°. Mixture M.P. with authentic sample was not depressed.

EXAMPLE 6

8,9-dihydro-9-isopropyl-2-phenylpyrimido[4,5-e][1,4]oxazepin-5(7H)-one

A mixture of 2.6 g. of 5-carbethoxy-4-chloro-2-phenylpyrimidine, 1.0 g. of 2-isopropylaminoethanol, and 1.1 g. of sodium carbonate in 50 ml. of ethanol was heated under reflux for 2 hours. The reaction mixture was taken to dryness on a rotary evaporator. The residue was triturated with water and filtered under suction. Recrystallization of the filter cake from benzene-petroleum ether gave the title product, M.P. 154–155° C.

*Analysis.*—Calcd. for $C_{16}H_{17}N_3O_2$ (percent): C, 67.82; H, 6.05; N, 14.83. Found (percent): C, 67.64; H, 5.79; N, 14.65.

EXAMPLE 7

9-butyl-8,9-dihydro-2-phenylpyrimido[4,5-e][1,4]oxazepin-5(7H)-one

A mixture of 2.6 g. of 5-carbethoxy-4-chloro-2-phenylpyrimidine, 1.2 g. of n-butylaminoethanol, 1.1 g. of sodium carbonate in 50 ml. of ethanol was heated under reflux, with stirring for 2 hours. The reaction mixture was filtered while hot. On cooling the filtrate, there was obtained the title product, M.P. 126–130° C. Recrystallization from ethyl acetate raised the M.P. to 127–129° C.

*Analysis.*—Calcd. for $C_{17}H_{19}N_3O_2$ (percent): C, 68.64; H, 6.44; N, 14.13. Found (percent): C, 68.38; H, 6.06; N, 14.23.

EXAMPLE 8

9-butyl-2-(m-chlorophenyl)-8,9-dihydropyrimido[4,5-e][1,4]oxazepin-5(7H)-one

The title product was prepared from 5.3 g. of 5-carbethoxy - 4 - chloro - 2 - m - chlorophenylpyrimidine, 2.3 g. of N-butylaminoethanol, and 2.1 g. of sodium carbonate in 50 ml. of absolute ethanol as in Example 6. The product showed a M.P. 89–93° C. Recrystallization from ethanol raised the M.P. to 98–100° C.

*Analysis.*—Calcd. for $C_{17}H_{18}ClN_3O_2$ (percent): C, 61.54; H, 5.47; Cl, 10.69; N, 12.60. Found (percent): C, 61.84; H, 5.37; Cl, 10.79; N, 12.45.

EXAMPLE 9

8,9-dihydro-9-(2-hydroxyethyl)-2-phenylpyrimido[4,5-e][1,4]oxazepin-5(7H)-one

The title product was prepared from 2.6 g. of 5-carbethoxy - 4 - chloro - 2 - phenylpyrimidine, 1.0 g. of diethanolamine and 1.0 g. of sodium carbonate in 50 ml. of ethanol as in Example 7. The product was recrystallized from ethanol, M.P. 150–152° C.

*Analysis.*—Calcd. for $C_{15}H_{15}N_3O_3$ (percent): C, 63.15; H, 5.30; N, 14.73. Found (percent): C, 63.02; H, 5.15; N, 14.75.

This compound, as well as the compounds of Examples 13, 16, 17, and 19, showed analgesic activity as well as the central nervous system depressant action.

EXAMPLE 10

9-benzyl-8,9-dihydro-2-phenylpyrimido[4,5-e][1,4]oxazepin-5(7H)-one

The product was prepared as in Example 7 from 2.6 g. of 5 - carbethoxy - 4 - chloro - 2 - phenylpyrimidine, 1.5 g. of N-benzylethanolamine and 1.0 g. of sodium carbonate in 50 ml. of ethanol. After recrystallization from ethanol the product had a M.P. 218–219° C.

*Analysis.*—Calcd. for $C_{20}H_{17}N_3O_2$ (percent): C, 72.49; H, 5.17; N, 12.68. Found (percent): C, 72.63; H, 5.17; N, 12.39.

EXAMPLE 11

9-benzyl-2-(m-chlorophenyl)-8,9-dihydropyrimido[4,5-e][1,4]oxazepin-5(7H)-one

The product was prepared as in Example 6 from 4.5 g. of 5 - carbethoxy - 4 - chloro - 2 - m - chlorophenylpyrimidine, 3.0 g. of N-benzylethanolamine and 2.1 g. of sodium carbonate in 50 ml. of ethanol. After recrystallization from methanol the title product was obtained, M.P. 150–153° C.

*Analysis.*—Calcd. for $C_{20}H_{16}ClN_3O_2$ (percent): C, 65.66; H, 4.41; Cl, 9.69; N, 11.49. Found (percent): C, 65.52; H, 4.35; Cl, 9.70; N, 11.42.

EXAMPLE 12

9-benzyl-8,9-dihydro-8-methyl-2-phenylpyrimido[4,5-e][1,4]oxazepin-5(7H)-one

The product was prepared as in Example 7 from 2.6 g. of 5 - carbethoxy - 4 - chloro - 2 - phenylpyrimidine, 1.6 g. of DL-2-benzylamino-1-propanol and 1.1 g. of sodium carbonate in 50 ml. of ethanol. After recrystallization from methanol the title product was obtained, M.P. 169–171° C.

*Analysis.*—Calcd. for $C_{21}H_{19}N_3O_2$ (percent): C, 73.02; H, 5.55; N, 12.17. Found (percent): C, 72.86; H, 5.35; N, 11.95.

EXAMPLE 13

8,9-dihydro-9-(2-methoxyethyl)-2-phenylpyrimido[4,5-e][1,4]oxazepin-5(7H)-one

The product was prepared as in Example 6 from 2.6 g. of 5 - carbethoxy - 4 - chloro - 2 - phenylpyrimidine, 1.2 g. of 2-(β-methoxyethylamino)ethanol and 1.1 g. of sodium carbonate in 50 ml. of ethanol by heating under reflux for about 2.5 hours. After recrystallization from cyclohexane there was obtained 1.6 g. of product, M.P. 94–96° C.

*Analysis.*—Calcd. for $C_{16}H_{17}N_3O_3$ (percent): C, 64.20; H, 5.72; N, 14.04. Found (percent): C, 64.41; H, 5.66; N, 13.86.

EXAMPLE 14

9-cyclohexyl-8,9-dihydro-2,7-diphenylpyrimido[4,5-e][1,4]oxazepin-5(7H)-one

The product was prepared as in Example 6 from 2.6 g. of 5 - carbethoxy - 4 - chloro - 2 - phenylpyrimidine, 2.2 g. of 2-cyclohexylamino-1-phenylethanol and 1.1 g. of sodium carbonate in 50 ml. of ethanol. After recrystallization from benzene-petroleum ether the product, M.P. 177–178° C. was recovered.

*Analysis.*—Calcd. for $C_{25}H_{25}N_3O_2$ (percent): C, 75.16; H, 6.31; N, 10.52. Found (percent): C, 75.14; H, 6.09; N, 10.62.

EXAMPLE 15

8,9-dihydro-9-phenethyl-2-phenylpyrimido[4,5-e][1,4]-oxazepin-5(7H)-one

The product was prepared as in Example 7 from 2.6 g. of 5-carbethoxy-4-chloro-2-phenylpyrimidine, 1.6 g. of 2-phenethylaminoethanol and 1.1 g. of sodium carbonate in 50 ml. of ethanol. After recrystallization from ethanol and the product, M.P. 150–152° C. was recovered.

*Analysis.*—Calcd. for $C_{21}H_{19}N_3O_2$ (percent): C, 73.02; H, 5.55; N, 12.17. Found (percent): C, 73.18; H, 5.65; N, 11.97.

EXAMPLE 16

9-(3-diethylaminopropyl)-8,9-dihydro-2-phenylpyrimido-[4,5-e][1,4]oxazepin-5(7H)-one dihydrochloride A mixture of 5.2 g. of 5-carbethoxy-4-chloro-2-phenylpyrimidine, 2.4 g. of 2-[3-diethylaminopropylamino)ethanol and 2.1 g. of sodium carbonate in 100 ml. of ethanol was heated with stirring under reflux for 4 hours. The reaction mixture was filtered and the filtrate was taken to dryness on a rotary evaporator. The residual oil was redissolved in 90 ml. of ethanol and cooled in ice. Hydrogen chloride gas was bubbled into the cold solution for a few minutes. Acetone (40 ml.) was added to the solution. The precipitate which was deposited gave a M.P. 214–217° C. Recrystallization from ethanol-petroleum ether gave the title product, M.P. 223–224° C.

*Analysis.*—Calcd. for $C_{20}H_{26}N_4O_2 \cdot 2HCl$ (percent): C, 56.21; H, 6.60; Cl, 16.59; N, 13.11. Found (percent): C, 55.99; H, 6.62; Cl, 16.40; N, 13.22.

EXAMPLE 17

8,9-dihydro-9-(2-morpholinoethyl)-2-phenylpyrimido-[4,5-e][1,4]oxazepin-5(7H)-one, dihydrochloride The product was prepared as in Example 16 from 2.6 g. of 5-carbethoxy-4-chloro-2-phenylpyrimidine, 1.7 g. of 2-(2-morpholinoethylamino)ethanol and 1.1 g. of sodium carbonate in 50 ml. of ethanol. The residual oil was dissolved in 50 ml. of methanol and then hydrogen chloride gas was bubbled into the solution. The crystalline product which was deposited had a M.P. 238–240° C. Two recrystallizations from acetone-95% ethanol afforded the title product, M.P. 248–250° C.

Analysis.—Calcd. for $C_{19}H_{24}Cl_2N_4O_3$ (percent): C, 53.40; H, 5.66; Cl, 16.59; N, 13.11. Found (percent): C, 53.44; H, 5.60; Cl, 16.45; N, 13.49.

EXAMPLE 18

8,9-dihydro-2-phenyl-9-[2-(1-pyrrolidinyl)-ethyl]pyrimido[4,5-e][1,4]oxazepin-5(7H)-one dihydrochloride The product was prepared as in Example 17 from 2.6 g. of 5-carbethoxy-4-chloro-2-phenylpyrimidine, 1.7 g. of 2-(2-pyrrolidinoethylamino)ethanol and 1.1 g. of sodium carbonate in 50 ml. of ethanol. Recrystallization from aqueous ethanol afforded the title product, M.P. 254–257° C.

Analysis.—Calcd. for $C_{19}H_{24}Cl_2N_4O_2$ (percent): C, 55.48; H, 5.88; Cl, 17.24; N, 13.62. Found (percent): C, 55.42; H, 5.68; Cl, 17.55; N, 13.54.

EXAMPLE 19

9-(2-diethylaminoethyl)-8,9-dihydro-2-phenylpyrimido-[4,5-e][1,4]oxazepin-5(7H)-one, dihydrochloride The product was prepared as in Example 17 from 2.6 g. of 5-carbethoxy-4-chloro-2-phenylpyrimidine, 1.6 g. of 2-(2-diethylaminoethylamino)ethanol and 1.1 g. of sodium carbonate in 50 ml. of ethanol. After two recrystallizations from methanol-acetone the title product was obtained, M.P. 240–242° C.

Analysis.—Calcd. for $C_{19}H_{26}Cl_2N_4O_2$ (percent): C, 55.20; H, 6.34; Cl, 17.15; N, 13.55. Found (percent): C, 54.97; H, 6.18; Cl, 16.98; N, 13.65

EXAMPLE 20

9-cyclohexyl-8,9-dihydro-2-phenylpyrimido[4,5-e][1,4]-oxazepin-5(7H)-one

A mixture of 2.6 g. of 5-carbethoxy-4-chloro-2-phenylpyrimidine, 1.4 g. of 2-cyclohexylaminoethanol and 1.1 g. of sodium carbonate in 50 ml. of ethanol was heated with stirring under reflux for 5 hours. The reaction mixture was filtered while hot. On cooling the filtrate a crystalline product was obtained. Recrystallization from ethanol gave the product with M.P. 200–202° C.

Analysis.—Calcd. for $C_{19}H_{21}N_3O_2$ (percent): C, 70.56; H, 6.55; N, 13.00. Found (percent): C, 70.49; H, 6.81; N, 12.88.

EXAMPLE 21

8,9-dihydro-9-methyl-2,7-diphenylpyrimido[4,5-e][1,4]-oxazepin-5(7H)-one

The compound was prepared as in Example 20 from 2.6 g. of 5-carbethoxy-4-chloro-2-phenylpyrimidine, 1.5 g. of α-(methylaminomethyl)benzyl alcohol and 1.1 g. of sodium carbonate in 50 ml. of ethanol. Recrystallization of the product from ethanol gave the title product with M.P. of 204–205° C.

Analysis.—Calcd. for $C_{20}H_{17}N_3O_2$ (percent): C, 72.49; H, 5.17; N, 12.68. Found (percent): C, 72.51; H, 5.04; N, 12.44.

EXAMPLE 22

8,9-dihydro-9-isopropyl-7-(α-naphthoxymethyl)-2-phenylpyrimido[4,5-e][1,4]oxazepin-5(7H)-one To a solution of 0.23 g. of sodium in 50 ml. of ethanol was added 2.95 g. of 1-(isopropylamino)-3-(α-naphthoxy)-2-propanol hydrochloride. This mixture was boiled under reflux for 1 hour with stirring. Sodium carbonate (1.0 g.) was added followed by 2.6 g. of 5-carbethoxy-4-chloro-2-phenylpyrimidine. Heating was continued an additional 2 hours and the reaction mixture was filtered. The filtrate was taken to dryness in vacuo on a rotary evaporator. The addition of 20 ml. of methanol to the oily residue caused it to crystallize. Recrystallization from ethanol gave the title product with M.P. 178–180° C.

Analysis.—Calcd. for $C_{27}H_{25}N_3O_3$ (percent): C, 73.78; H, 5.78; N, 9.56. Found (percent): C, 73.82; H, 5.66; N, 9.50.

The invention claimed is:

1. A compound having the structural formula:

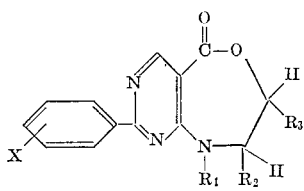

wherein

X represents hydrogen or chlorine;
$R_1$ is lower alkyl, cyclohexyl, hydroxy(lower)alkyl, methoxy(lower)alkyl, di(lower)alkylamino(lower)alkyl, pyrrolidino(lower)alkyl, morpholino(lower)alkyl, or phenyl(lower)alkyl;
$R_2$ is hydrogen or methyl;
$R_3$ is hydrogen, phenyl, or naphthyloxy(lower)alkyl.

2. A compound of claim 1; in which $R_1$ is ethyl, methoxyethyl, pyrrolidinoethyl, or diethylamino(lower)alkyl, said lower alkyl having 2 to 3 carbon atoms; and X, $R_2$, and $R_3$ are each hydrogen.

3. As a compound of claim 1; 9-ethyl-8,9-dihydro-2-phenylpyrimido[4,5-e][1,4]oxazepin-5(7H)-one.

4. As a compound of claim 1; 8,9-dihydro-9-methyl-2-phenylpyrimido[4,5-e][1,4]oxazepin-5(7H)-one.

5. As a compound of claim 1; 8,9-dihydro-9-isopropyl-2-phenylpyrimido[4,5-e][1,4]oxazepin-5(7H)-one.

6. As a compound of claim 1; 9-butyl-8,9-dihydro-2-phenylpyrimido[4,5-e][1,4]oxazepin-5(7H)-one.

7. As a compound of claim 1; 9-butyl-2-(m-chlorophenyl)-8,9-dihydropyrimido[4.5-e][1,4]oxazepin-5(7H)-one.

8. As a compound of claim 1; 8,9-dihydro-9-(2-hydroxyethyl)-2-phenylpyrimido[4,5-e][1,4]oxazepin-5(7H)-one.

9. As a compound of claif 1; 9-benzyl-8,9-dihydro-2-phenylpyrimido[4,5-e][1,4]oxazepin-5(7H)-one.

10. As a compound of claim 1; 9-benzyl-2-(m-chlorophenyl) - 8,9 - dihydropyrimido[4,5 - e][1,4]oxazepin-5(7H)-one.

11. As a compound of claim 1; 9-benzyl-8,9-dihydro-8-methyl - 2 - phenylpyrimido[4,5-e][1,4]oxazepin-5(7H)-one.

12. As a compound of claim 1; 8,9-dihydro-9-(2-methoxy - ethyl - 2 - phenylpyrimido[4,5 - e][1,4]oxazepin-5(7H)-one.

13. As a compound of claim 1; 9-cyclohexyl-8,9-dihydro - 2,7 - diphenylpyrimido[4,5-e][1,4]oxazepin-5(7H)-one.

14. As a compound of claim 1; 8,9-dihydro-9-phenethyl-2-phenylpyrimido[4,5-e][1,4]oxazepin-5(7H)-one.

15. As a compound of claim 1; 9-(3-diethylaminopropyl) - 8,9-dihydro-2-phenylpyrimido[4,5-e][1,4]oxazepin-5(7H)-one.

16. As a compound of claim 1; 8,9-dihydro-9-(2-morpholinoethyl) - 2 - phenylpyrimido[4,5 - e][1,4]oxazepin-5(7H)-one.

17. As a compound of claim 1; 8,9-dihydro-2-phenyl-9-[2 - (1-pyrrolidinyl)ethyl]pyrimido[4,5-e][1,4]oxazepin-5(7H)-one.

18. As a compound of claim 1; 9-(2-diethylaminoethyl)-8,9 - dihydro - 2 - phenylpyrimido[4,5 - e][1,4]oxazepin-5(7H)-one.

19. As a compound of claim 1; 9-cyclohexyl-8,9-dihydro-2-phenylpyrimido[4,5-e][1,4]oxazepin-5(7H)-one.

20. As a compound of claim 1; 8,9-dihydro-9-methyl-2,7-diphenylpyrimido[4,5-e][1,4]oxazepin-5(7H)-one.

21. As a compound of claim 1; 8,9-dihydro-9-isopropyl-7 - (α-napthoxymethyl)-2-phenylpyrimido[4,5-e][1,4]oxazepin-5(7H)-one.

References Cited

UNITED STATES PATENTS 2,807,616   9/1957   Falco et al. _____ 260—256.4F

ALEX MAZEL, Primary Examiner

R. J. GALLAGHER, Assistant Examiner

U.S. Cl. X.R.

260—247.5R, 251R, 256.4F, 376.5N, 570.6, 584R, 584C; 424—248, 251